United States Patent
Varadarajan et al.

(10) Patent No.: US 9,779,304 B2
(45) Date of Patent: Oct. 3, 2017

(54) FEATURE-BASED VIDEO ANNOTATION

(71) Applicant: Google Inc., Mountain View, CA (US)

(72) Inventors: Balakrishnan Varadarajan, Sunnyvale, CA (US); George Dan Toderici, Mountain View, CA (US); Apostol Natsev, Sunnyvale, CA (US); Nitin Khandelwal, Milpitas, CA (US); Sudheendra Vijayanarasimhan, Mountain View, CA (US); Weilong Yang, Fremont, CA (US); Sanketh Shetty, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 14/823,946

(22) Filed: Aug. 11, 2015

(65) Prior Publication Data

US 2017/0046573 A1     Feb. 16, 2017

(51) Int. Cl.
*G06K 9/62*          (2006.01)
*G06K 9/00*          (2006.01)
(Continued)

(52) U.S. Cl.
CPC ..... *G06K 9/00718* (2013.01); *G06F 17/3082* (2013.01); *G06F 17/30784* (2013.01);
(Continued)

(58) Field of Classification Search
CPC ............... G06F 17/30781–17/30858; G06K 9/00711–9/00765
See application file for complete search history.

(56) References Cited

U.S. PATENT DOCUMENTS 8,533,134 B1 *   9/2013   Zhao ................. G06F 17/30705
                                                          706/12
8,649,613 B1 *   2/2014   Leung ................ G06K 9/00724
                                                          382/155
(Continued)

FOREIGN PATENT DOCUMENTS

EP          2638509 A1     9/2013
WO   WO 2012/064976     5/2012

OTHER PUBLICATIONS

PCT International Search Report and Written Opinion for PCT/IB2016/054653, Nov. 28, 2016, 11 Pages.

*Primary Examiner* — Brian P Werner
(74) *Attorney, Agent, or Firm* — Byrne Poh LLP

(57) ABSTRACT

A system and methodology provide for annotating videos with entities and associated probabilities of existence of the entities within video frames. A computer-implemented method identifies an entity from a plurality of entities identifying characteristics of video items. The computer-implemented method selects a set of features correlated with the entity based on a value of a feature of a plurality of features, determines a classifier for the entity using the set of features, and determines an aggregation calibration function for the entity based on the set of features. The computer-implemented method selects a video frame from a video item, where the video frame having associated features, and determines a probability of existence of the entity based on the associated features using the classifier and the aggregation calibration function.

20 Claims, 3 Drawing Sheets

(51) Int. Cl.
  *G06F 17/30* (2006.01)
  *G06K 9/52* (2006.01)
  *H04N 5/265* (2006.01)

(52) U.S. Cl.
  CPC ............ *G06K 9/52* (2013.01); *G06K 9/6201* (2013.01); *G06K 9/627* (2013.01); *G06K 9/6256* (2013.01); *H04N 5/265* (2013.01)

(56) References Cited

U.S. PATENT DOCUMENTS

| | | | |
|---|---|---|---|
| 8,732,766 B2 | 5/2014 | Fink et al. | |
| 2005/0160457 A1 | 7/2005 | Rui et al. | |
| 2012/0123978 A1* | 5/2012 | Toderice | G06F 17/30799 706/12 |
| 2013/0117780 A1* | 5/2013 | Sukthankar | G06K 9/00718 725/32 |
| 2013/0282747 A1* | 10/2013 | Cheng | G06F 17/30023 707/758 |

* cited by examiner

FEATURE-BASED VIDEO ANNOTATION

BACKGROUND OF THE INVENTION

Field of the Invention

The present application is related to video processing, more particularly, to labelling video frames.

Description of the Background Art

Media hosting services can host millions of media content items (also referred to as "media items", or simply "items"), such as music, movies, e-books, news articles, user generated content, and the like. Typically, users of the media hosting service can browse or search media content items by providing keywords or search terms to search the information describing the media content items such as titles, summaries of the media content items, objects of interest, etc. Due to the large number of media content items hosted by the media hosting service, many media content items may be returned responsive to user searches. Consequently, it can be difficult for the users to assess which of the hundreds or thousands of media content items in the set of search results are of the greatest relevance to them. In addition, it may be extremely difficult for a user to pinpoint the portions of a media content item that are most relevant.

Additional information may be provided to users to help the users to assess the relevance of the search results. For example, metadata associated with the video content may allow users to assess the relevance of the video content items such as images from the video content items, authors of the video content items, length of the video content items or information indicating the popularity of the video content items. However, even with the additional information describing the video content items, it is difficult for the user to determine whether the video content items contain content that is relevant to their search query.

SUMMARY OF THE INVENTION

The embodiments described herein provide methods, computer program products, and systems for annotating videos with entities and associated probabilities of existence of the entities within video frames. In one embodiment, a computer-implemented method identifies an entity from a plurality of entities identifying characteristics of video items. The computer-implemented method selects a set of features correlated with the entity based on a value of a feature of a plurality of features, determines a classifier for the entity using the set of features, and determines an aggregation calibration function for the entity based on the set of features. The computer-implemented method selects a video frame from a video item, where the video frame having associated features, and determines a probability of existence of the entity based on the associated features using the classifier and the aggregation calibration function.

In one embodiment, a non-transitory computer-readable medium comprising computer program instructions executable by a processor. The computer program instructions comprise instructions for identifying an entity from a plurality of entities identifying characteristics of video items. The computer program instructions comprise instructions for selecting a set of features correlated with the entity based on a value of a feature of a plurality of features. The computer program instructions comprise instructions for determining a classifier for the entity using the set of features. The computer program instructions comprise instructions for determining an aggregation calibration function for the entity based on the set of features. The computer program instructions comprise instructions for selecting a video frame from a video item, the video frame having associated features. The computer program instructions comprise instructions for determining a probability of existence of the entity based on the associated features using the classifier and the aggregation calibration function.

In one embodiment, a system comprises a processor for executing computer program instructions and a non-transitory computer-readable storage medium comprising computer program instructions executable by the processor. The computer program instructions comprise instructions for identifying an entity from a plurality of entities identifying characteristics of video items. The computer program instructions comprise instructions for selecting a set of features correlated with the entity based on a value of a feature of a plurality of features. The computer program instructions comprise instructions for determining a classifier for the entity using the set of features. The computer program instructions comprise instructions for determining an aggregation calibration function for the entity based on the set of features. The computer program instructions comprise instructions for selecting a video frame from a video item, the video frame having associated features. The computer program instructions comprise instructions for determining a probability of existence of the entity based on the associated features using the classifier and the aggregation calibration function.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
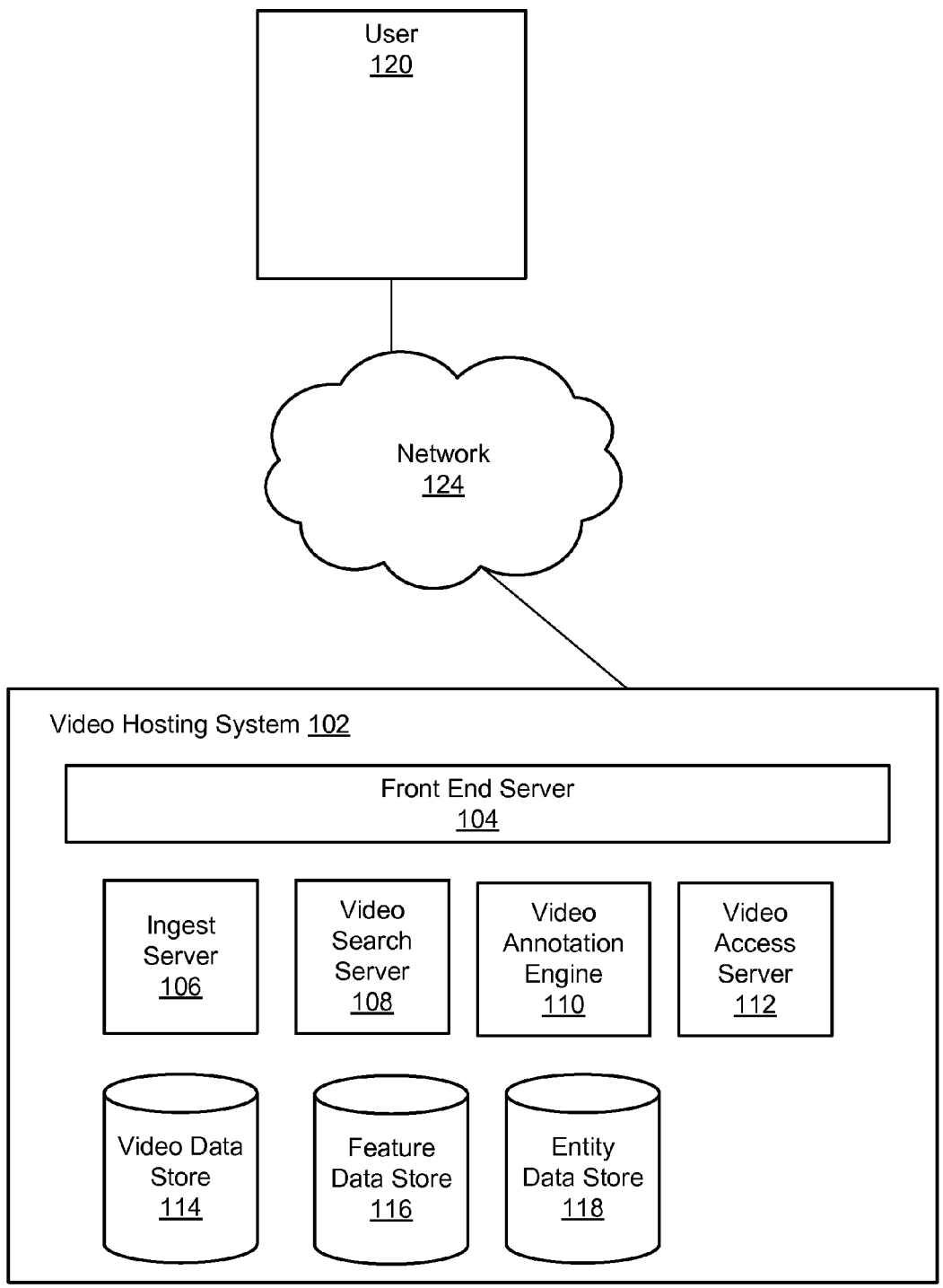
FIG. 1 is a high-level block diagram of a video hosting system server providing video annotation according to one embodiment.

FIG. 1 is a high-level block diagram of a system providing annotation of videos with probabilities of existence of entities at each video frame according to one embodiment. FIG. 1 illustrates a video hosting system 102 and a user 120 connected by a network 124. The user 120 represents an entity that can access videos contained within the video hosting system 102. A user 120 can access a video from the video hosting system 102 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting system 102 is adapted to receive videos for storage in order to enable the sharing of the videos with other users.

In one embodiment, the user 120 uses a computer system to communicate with the video hosting system 102 over the network 124. In one embodiment, the computer system is a personal computer executing a web browser 122 such as MICROSOFT INTERNET EXPLORER or MOZILLA FIREFOX that allows the user to view web pages and videos provided by the video hosting system 102. In one embodiment, the web browser 122 includes a video player (e.g., Flash™ from Adobe Systems, Inc.). The user 120 may utilize a network-capable device other than a computer system, such as a smart phone, a tablet, a car, a television "set-top box," etc. Although FIG. 1 illustrates only a single user, it should be understood that many users (e.g., millions) can communicate with the website at any time. The single user 120 is illustrated in order to simplify and clarify the present description.

The network 124 represents the communication pathways between the user and the video hosting system 102. In one embodiment, the network 124 is the Internet, but may also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting system 102 represents any system that allows users to access video content via searching and/or browsing interfaces. The sources of videos can be from user uploads of videos, searches or crawls of other websites or databases of videos, or the like, or any combination thereof. For example, in one embodiment a video hosting system 102 can be configured to allow for user uploads of content; in another embodiment a video hosting system 102 can be configured to only obtain videos from other sources by crawling such sources or searching such sources in real time.

A suitable video hosting system 102 for implementation of the system is the YOUTUBE™ website; other video hosting websites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting system 102 comprises a front end server 104, an ingest server 106, a video search server 108, a video annotation engine 110, a video access server 112, a video data store 114, a feature data store 116, and an entity data store 118. Many conventional features, such as firewalls, load balancers, application servers, failover servers, site management tools and so forth are not shown so as not to obscure the features of the system.

The front end server 104 handles all communication with the user via the network 124. The front end server receives requests from users and communicates with the other servers of the video hosting system 102 in order to process the requests. The front end server 104 is further configured to monitor user interactions with the video hosting system 102. For example, if a user clicks on a web page, views a video, makes a purchase, opens a document, fills a web-based form, the front end server 104 monitors these interactions. The front end server 104 may be further configured to transmit and present the requested video and related video links to the user on a webpage. The requested video is streamed by the front end server 104 to the user. One or more related video links appear on the webpage where the requested video is playing, such that the related video links can be selected by a user 120 in order to view the related videos.

Any content received via the network 124 from a user for posting to the video hosting system 102 is passed on to the ingest server 106 for processing. The processing of the video file includes assigning an identification number to the newly received video file. Other steps of processing the video file may include formatting (e.g., transcoding), compressing, metadata tagging, content analysis, and/or other data processing methods. The user transmits a form along with the video file transmitted to the video hosting system 102. The user may include in the form information that describes the video (e.g., title, description, and tag information). The form information may also include an indication of the media type, which for uploaded videos would always be the "video" type. The ingest server 106 stores the processed video file in a video data store 114 and stores the information included in the form as metadata of the video file. The video data store 114 is the storage system where the video files transmitted to the video hosting system 102 are stored. A video may be accompanied by icons or thumbnail views, associated metadata, such as title, author, tags and rating.

The ingest server 106 may generate features used to characterize the media content items stored in the video data store 114. Features may be stored with media content items as metadata, for example in the video data store 114. The ingest server 106 may further store the features in the feature data store 116. An index may be maintained in the video data store 114 that associates each video file stored in the video data store with the features stored in the feature data store 116 that are associated with the video file. In one embodiment, for each video frame of a video file, the ingest server 106 generates features that characterize each video frame of the video file. For example, a feature can be a bigram from the title or description of the video.

In addition, the ingest server 106 may identify entities associated with the video files stored in the video data store 114 and store the entities in the entity data store 118. Entities are text descriptors that identify characteristics of media content items, for example, actual things, ideas, or concepts that have meanings. For example, "pugs", "Machu Picchu", "philosophy", and "sleepy" are all examples of entities. Entities may be stored with media content items as metadata, for example in the video data store 114. In one embodiment, for each video file, the ingest server 106 identifies entities associated with each video frame of the video file. Each video frame of each video file may have one or more entities associated with it. For example, if a video clip depicted a pug staring at a croissant in Golden Gate Park, the entities stored as meta data may include "dog", "food", "San Francisco", "pug", "croissant", "hungry", and "Golden Gate Park", among others.

Entities may be associated with media content items when the media content items are ingested by the ingest server 106. The set of potential entities that can be associated with media content items may be derived from tags or other descriptive information provided by a user. For videos, entities may be derived from textual descriptions and metadata accompanying the videos, as well as closed captioning text present in the video, or by converting audio to text and then extracting entities from the text. For textual documents (e.g., web pages, emails, etc.), entities may be determined using term frequency analysis, semantic analysis, natural language processing, or other methods. An index is maintained in the video data store 114 that associates each entity with the set of content items to which the entity is identified. In addition, for each content item, there is maintained a list of the entities associated with the content item.

The video search server 108 processes any search query received by the front end server 104 from a user. The search query transmitted by the user to the front end server 104 includes search criteria, such as keywords that may identify videos the user is interested in viewing. For example, the search query might be the textual string "machu picchu". The video search server 108 may use the search criteria, for example, to query the metadata of and/or entities associated with all video files stored in the video data store 114 or to query the entity data store 118. The search results from the query are transmitted to the front end server 104, so that the search results can be presented to the user.

The video access server 112 receives from the front end server requests from users that wish to view (or play back) a specific video. From the user perspective, a user may submit a request for a video by browsing the different categories of the video hosting system 102 or by clicking on a link to a video from a search results webpage. The request transmitted by the user can include the identification number of the video the user wishes to view (which can be included automatically once the user clicks on the link for the video). The video access server 112 uses the identification number to search and locate where the video is stored in the video data store 114. The video access server 112 provides the video requested to the front end server 104.

The video annotation engine 110 annotates video files stored in the video data store 114. For a video file, the video annotation engine 110 may annotate each video file according to the features associated with the video file stored in the feature data store 116 and the entity data store 118. For each video file stored in the video data store 114, the video annotation engine 110 annotates each video frame of the video file with entities that exist in that frame. The video annotation engine 110 may determine a probability of existence of an entity in a video frame based on the features associated with the video frame. For example, the video annotation engine 110 determines the probability p(e) of existence of an entity e being affected by one or more features associated with a video frame (i.e., at time t for the video). The probability distribution for the entity e defined over a space of possible features F is determined. That is, the video annotation engine 110 may determine correlations between features stored in the feature data store 116 and an entity in the entity data store 118. The probability of the existence of the entity in a video frame may be determined by identifying features that are correlated with the entity from the features associated with the video frame, determining the probability of existence of the entity based on each relevant feature, and combining the probability of existence of the entity determined for all relevant features.

The video annotation engine 110 may determine, based on a value of a feature stored in the feature data store 116, a probability of existence of an entity stored in the entity data store 118. For example, the probability $p_f(e|x_f)$ represents the probability of existence of an entity at a video frame in response to a feature f with a confidence score $x_f$. The probability of existence of an entity based on an individual features is calibrated such that the probability of existence of an entity at a video frame determined by various features are normalized and can be combined. This is because, for a video frame, different features that are detected to be associated with the video frame may correspond to different values that have different meanings. For an entity e, the video annotation engine 110 may identify features that are correlated with the entity and identify features that are not correlated with the entity. A feature is correlated with an entity when a detection of the feature indicates existence or non-existence of the entity. The video annotation engine 110 may further evaluate the strength of the correlation between an entity and a feature. That is, the importance of each feature to the existence of an entity is represented by an importance weight associated with the feature. For an entity e, a classifier may be determined for each feature that is identified to be correlated with the entity.

Using the labeled entities and associated probabilities, the video annotation engine 110 can take a number of different actions. For example, the video annotation engine 110 can identify video frames within video content items that are most relevant to search queries containing one or more keywords, e.g., showing those frames in search results as representations of the video content items. The video annotation engine 110 can further rank a set of video content items retrieved responsive to a search query according to the probabilities of existence of the entities labeled for video frames of each video content items. The video annotation engine 110 can further use the labeled entities and associated probabilities of existence to identify video frames within video content items that are relevant to information describing the video content items, such as the title of the video.

Identifying probabilities of existence of entities allows a provider of the videos such as a media host to provide video content items that are most relevant to a user's search query based on the identified entities and the associated probabilities of existence. This identification further allows the media host to display information for a set of videos retrieved responsive to a search query in association with entities that are most relevant to the search query and the video frames that are most relevant to the search query, thus providing the users with additional information which they can use to assess the relevance of the videos to their search and identify videos they wish to view.

It should be appreciated that the data processing operations of the video annotation engine 110, as described herein, inherently require a programmed computer system for their practical implementation. To simplify and clarify the present description, the content received and shared by the video hosting system 102 will be referred to as videos, video files, or video items, but it should be understood that the video hosting system 102 can receive and share content of any media type. This content may be referred to as media content items, media items, or items. Thus, the operations of the video annotation engine 110 described herein for annotating video files can be applied to any type of media content item, not only videos; other suitable type of content items include audio files (e.g. music, podcasts, audio books, and the like), documents, multimedia presentations, digital purchases of goods and services, and so forth.

Video Annotation

Figure 2:
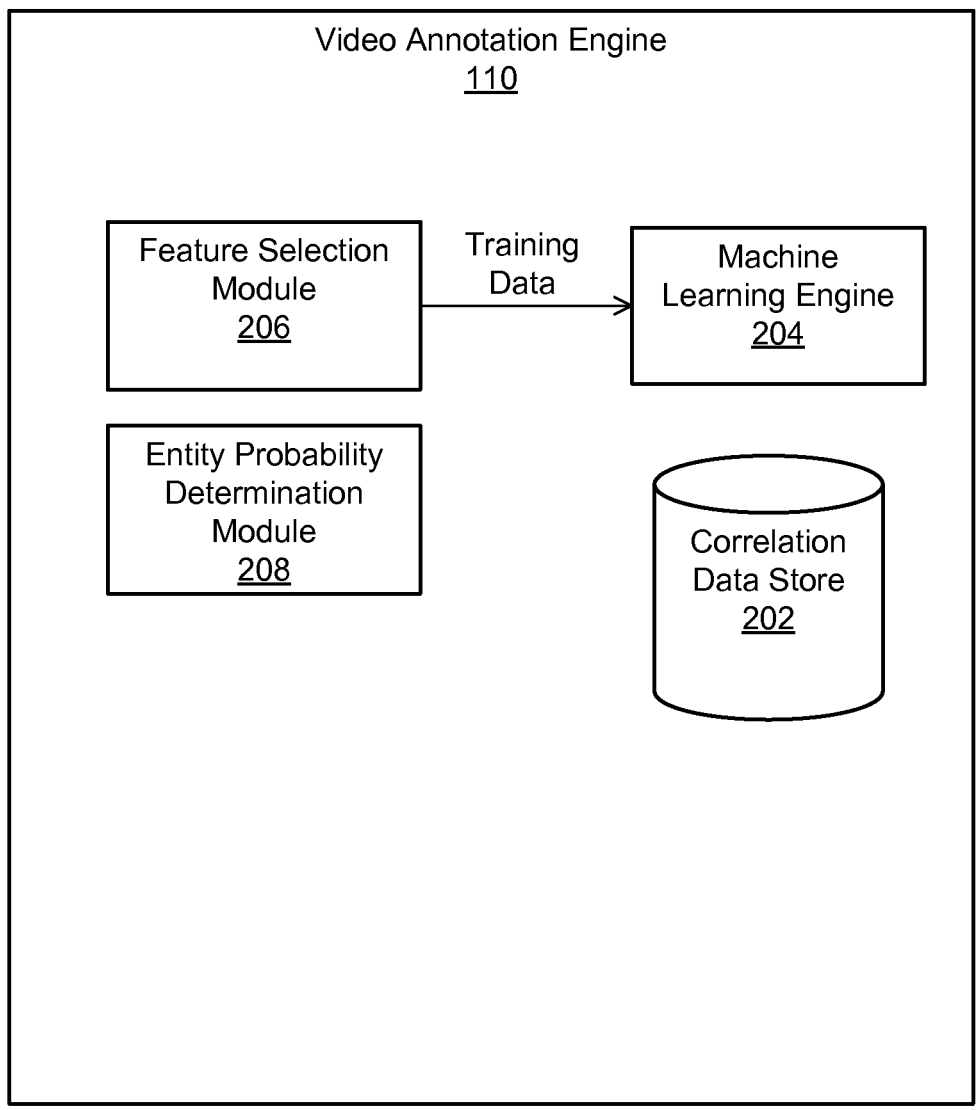
FIG. 2 is a block diagram of a video annotation engine according to one embodiment.

FIG. 2 is a high-level block diagram illustrating a detailed view of the video annotation engine 110 according to one embodiment. As shown in FIG. 2, the video annotation engine 110 includes several modules. Those of skill in the art will recognize that other embodiments can have different modules than the ones described here, and that the functionalities can be distributed among the modules in a different manner. In addition, the functions ascribed to the video annotation engine 110 can be performed by multiple engines. As illustrated, the video annotation engine 110 includes a correlation data store 202, a machine learning engine 204, a feature selection module 206, and an entity probability determination module 208.

The machine learning engine 204 measures the correlation between an entity (e.g., "machu picchu") and a feature (e.g., "Peru", "Inca", or "Cusco")) and stores such association in the entity-feature correlation data store 202. The machine learning engine 204 may use a semi-supervised learning approach or hard-negative learning approach to determine the correlation between an entity and features. The hard-negative learning down-weights features that lead to mis-classification of an entity.

For each entity e stored in the entity data store 118, the machine learning engine 204 may determine a classifier using training data (e.g., video items including features F identified to be correlated to the entity e) provided by the feature selection module 206. The classifier may be a linear fusion model for an entity based on features. The classifier may measure the correlation between a feature and an entity. For each entity e, the machine learning engine 204 determines a weight matrix $\{w_{ef}\}$ for each pair of the entity e and a correlated feature. The weight matrix $\{w_{ef}\}$ includes a weight vector $w_e$ for each feature F selected by the feature selection module 206 that is correlated with the entity e. The weight vector $w_e$ indicates the correlation between the entity e and the feature. The entity-feature correlation stored in the entity-feature correlation data store 202 and the matrix $\{w_{ef}\}$ can provide a basis for the entity probability determination module 208 to determine the probability of existence of an entity. The value of a vector $w_e$ is at least zero (i.e., $w_e \geq 0$).

For an entity, given a set of features associated with a video frame, the fusion model may output a score that is at least 0. The greater the score is, the greater the probability that the entity exists on the frame. For an entity e, the machine learning module may apply a linear aggregator model to maximize the precision (P) of the probability at a given level of recall (R). The linear fusion model may be defined by the weight vector $w_e$ and a threshold $\tau_e$. For example, there are N training examples with ground truth scores $0 \leq g_{(i)} \leq 1$ for the $i^{th}$ example and features x(i). The value of the feature f is given a $x_f(i)$. The recall (R) and the precision (P) for a given weight vector $w_e$ and a threshold $\tau_e$ are shown according to Equations (1) and (2):

$$R(w_e, \tau_e) = \sum_{i=1}^{N} g_i * I(w_e^T x_i \geq \tau_e) / \sum_{i=1}^{N} g_i, \quad (1)$$

$$p(w_e, \tau_e) = \sum_{i=1}^{N} g_i * I(w_e^T x_i \geq \tau_e) / \sum_{i=1}^{N} I(w_e^T x_i \geq \tau_e). \quad (2)$$

Both recall (R) and precision (P) are numbers between zero and one. The machine learning engine 204 may maximize the precision P while maintaining the recall R at least some given threshold level (e.g., 70%).

The machine learning engine 204 may further determine an aggregation calibration function q(e|y). The entity probability determination module may use the calibration function q(e|y) to map a fusion score to the probability of an entity being central to a video frame. An entity is central to a video if it is the main concept of the video. For example, for a video of a Lady Gaga concert, the entities "Lady Gaga" and "concert" are central whereas the entity "crowd" is not central. This allows matching a query with a video frame as the scores of the entities corresponding to the query are interpreted as probabilities.

The feature selection module 206 provides training data to the machine learning engine 204. The feature selection module 206 selects features for training the machine learning engine 204 and provides video items or video frames having the selected features as training data. Since the set F of all possible features for a video frame may be quite large (e.g., 240,000 features), using all features identified for a video could potentially overburden the machine learning engine 204. For an entity e, the feature selection module 206 selects features F that are correlated with the entity e. The features identified for a frame may have different values $x_f$, and thus using their absolute values cannot indicate how correlated a feature is with an entity. The feature selection module 206 may determine a function that calibrates the value of features to probabilities of the entity. The feature selection module 206 may calibrate all the features stored in the feature data store 116 to probabilities of existence of the entity and select the features that are correlated with an entity based on the calibrated probabilities of existence of the entity. In addition, the feature selection module 206 identifies features that provide the best separation between positive correlations and negative correlations. A feature that is positively correlated with an entity indicates that the entity is likely to exist in response to detection of the feature. A feature that is negatively correlated with an entity indicates that the entity is unlikely to exist in response to detection of the feature.

Frames may be associated with ground truth labels g, for example, the centrality probabilities. The centrality probability is the probability of an entity being central to a video frame. The centrality probability may be a number between 0 and 1. In some embodiments, all entities that are marked as central have the centrality probability of at least 0.6. The feature selection module 206 may determine a feature-to-entity calibrator $p_f(e|x_f)$. The feature-to-entity calibrator is a function that calibrates a value of a feature to a probability of existence of an entity. The feature selection module 206 may smooth the ground truth associated with each feature when calibrating the features. As a result, features can be ranked according to their scores after they are calibrated. Features that are not correlated with an entity will not be selected for training the machine learning engine 204. In one embodiment, the feature selection module 206 selects features using isotonic regression. The isotonic regression is a piecewise linear increasing function that that is composed of m+1 linear segments. For example, $\{x_f(k), g(k), w(k)\}_{k=1 \ldots N}$ is the set of training data ordered by the value of a feature $x_f(k)$, g(k) is the average ground truth value at $x_f(k)$, and w(k) is the number of training samples that have $x_f(k)$ as the feature value. The class of functions to estimate the isotonic regression may be defined by a set of indices I and an assignment O according to Equations (3) and (4) such that $p_f(e|x_f(i_k)) = y(i_k)$:

$$I = \{0 = i_0 < i_1 \ldots < i_m \leq N\} \quad (3),$$

$$0 = y(i_0) \leq y(i_1) \leq \ldots \leq y(i_m) \leq 1 \quad (4).$$

The feature selection module 206 determines that for any x such that $x_f(i_k) \leq x \leq x_f(i_{k+1})$, the feature to entity calibrator $p_f(e|x)$ is linearly interpolated as shown in Equation (5):

$$p_f(e|x) = \frac{(x_f(i_{k+1}) - x) * y(i_k) + (x - x_f(i_k)) * y(i_{k+1})}{x_f(i_{k+1}) - x_f(i_k)}, \quad (5)$$

where x and y are features (e.g., y is "grand canyon" and x is "canyon".)

The feature selection module 206 further determines that for x such that $x \geq x_f(i_m)$, the feature to entity calibrator $p_f(e|x)$ is linearly interpolated as shown in Equation (6):

$$p_f(e|x) = y(i_m) \quad (6).$$

The feature selection module 206 trains the isotonic regressor by minimizing the following objective function as shown in Equation (7) such that $$\frac{dy}{dx} \geq 0:$$

$$\sum_j w(j) * (y(j) - g(j))^2 + \lambda \int_0^1 y'(x)^2 dx. \quad (7)$$

When training the isotonic regressor, the feature selection module 206 defines its objectives including making the final function as close to the ground truth as possible, and regularizing the derivative and avoiding sudden changes in the feature to entity calibrator $p_f(e|x_f)$. After calibrating all features, the importance of the features may be sorted according to the maximum value of the feature to entity calibrator $p_f(e|x_f)$ for each feature given by $p_f(e|\infty)$.

The feature selection module 206 selects features such that the maximum value $pf(e|\infty)$ is at least a threshold value (e.g., 0.05). The feature selection module 206 selects the set of features $F_e$ for the entity e according to the decision function $\max_{f \in F_e} p_f(e|x_f) \geq \tau$. That is, for the entity e, the maximum probability of existence of the entity e according to any feature of the set of features $F_e$ selected by the feature selection module 206 is at least $\tau$. As described above, the feature selection module 206 may limit the number of features to be selected to avoid over-burdening the machine learning engine 204.

The entity probability determination module 208 determines, for each entity e stored in the entity data store 118, the probability of the existence of the entity e given the features x identified for a video frame. The entity probability determination module 208 determines the probability of existence of an entity e according to the features x identified for a video frame based on measured correlation between the entity e and the features x, the weight vector matrix $\{w_{ef}\}$, and the aggregation calibration function q(e|y). The entity probability determination module 208 may determine the probability distribution $p_e(x)$ for each entity e that is defined over the space of correlated features F according to Equation (8):

$$p_e(x) \approx q_e\left(\sum_{f \in F} w_{ef} p_f(e|x_f)\right), \quad (8)$$

where $p_f(e|x_f)$ is a function that calibrates a value of an individual feature $x_f$ to the probability of existence of the entity e, $w_{ef}$ is a weight vector for the feature f, and $q_e$ is a function that calibrates the fused score to the probability of existence of the entity e. The entity probability determination module 208 may annotate each video frame with entities stored in the entity data store 118 and determined probabilities of existence.

Figure 3:
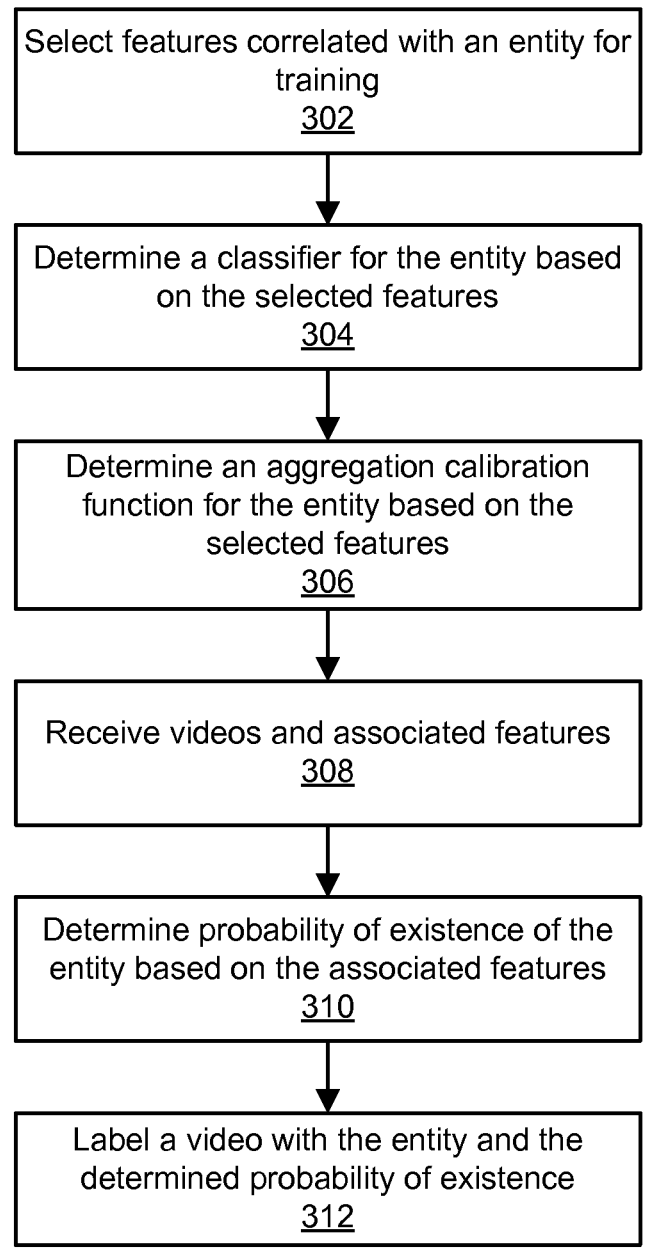
FIG. 3 is a flowchart illustrating a process for annotating videos with probabilities of existence of entities according to one embodiment.

FIG. 3 is a flowchart illustrating a process for annotating videos with probabilities of existence of entities according to one embodiment. For an entity, the method selects 302 features that are correlated with the entity for training a machine learning model. Features that are correlated with an entity are those features that may determine whether or not an entity is present within a video frame. The method identifies and down-weights features that lead to mis-classification of an entity. The method may determine a feature-to-entity calibrator which is a function that calibrates a value of the feature to a probability of existence of the entity. For an entity, the method selects those features for which the maximum probability of the entity is at least a given threshold value. For an entity, the method selects video items of video frames that have at least one selected feature as training data and provide the training data for the machine learning model.

The machine learning model determines 304 a classifier for the entity using the training data including the selected features. For an entity, the classifier may be a linear fusion model based on a weight vector matrix and a threshold. The machine learning model evaluates the correlation of each selected feature with the entity and combines the individual probability of existence of the entity based on each selected feature to determine a fusion score. For the entity, the machine learning model may select a classifier by maximizing the precision of the classifier at a given level of recall.

The machine learning model determines 306 an aggregation calibration function for the entity based on the selected features. The aggregation calibration function calibrates the fusion score to the probability of an entity being central to a video frame. The method receives 308 video items and features that are associated with each video frame of the video items. The method determines the probability of existence of the entity based on the associated features using the feature-to-entity calibrator, the classifier, and the aggregation calibration function. The method may determine probabilities of existence of all entities stored in the entity data store 118 for each video frame of a video item. The method 312 labels the video frame with the entity and the determined probability of existence of the entity. The method may label each video frame of a video item with entities and the determined probability for each entity.

The method may further receive a search query from a user and determine and provide those video files or video frames according to the search query. The method may determine the video files or video frames by querying the labels of entities and the probability of existence of the entity on video frames. The method can identify video frames within video content items that are most relevant to search queries containing one or more keywords, e.g., showing those frames in search results as representations of the video content items. The method can further rank a set of video content items retrieved responsive to a search query according to the probabilities of existence of the entities labeled for video frames of each video content items. The method can further use the labeled entities and associated probabilities of existence to identify video frames within video content items that are relevant to information describing the video content items, such as the title of the video.

Additional Considerations

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method for annotating videos with entities and associated probabilities of existence of the entities within video frames, the method comprising:
   identifying an entity from a plurality of entities identifying characteristics of video items;
   from a plurality of features characterizing the video items, selecting a set of features correlated with the entity based on a value of each feature;
   determining a classifier for the entity using the set of features, the classifier being a linear fusion model for the entity based on the set of features and determining the classifier comprising determining a weight vector for each feature of the set of features;
   determining an aggregation calibration function for the entity based on the set of features, the aggregation calibration function calibrating a fusion score to a probability of the entity being central to an individual video frame;
   selecting a video frame from a video item, the video frame having associated features; and
   determining a probability of existence of the entity based on the associated features using the classifier and the aggregation calibration function.

2. The method of claim 1, further comprising labeling the video frame with the entity and the probability of existence of the entity.

3. The method of claim 1, wherein the step of selecting a set of features correlated with the entity comprises determining a calibration function that calibrates a value of a feature of the plurality of features to an individual probability of existence of the entity.

4. The method of claim 3, wherein the step of selecting a set of features correlated with the entity comprises determining the individual probability of existence of the entity based on the value of each feature of the plurality of features, and the individual probabilities of existence of the entity for the plurality of features are normalized.

5. The method of claim 4, wherein the step of selecting a set of features correlated with the entity further comprises selecting the set of features such that a maximum individual probability of existence of the entity corresponding to each selected feature is at least a given threshold value.

6. The method of claim 1, wherein the step of determining a classifier for the entity comprises maximizing a precision for the linear fusion model and maintaining a recall to be at least a given threshold value.

7. The method of claim 3, wherein the step of determining a probability of existence of the entity based on the associated features comprises:
   using the calibration function to determine an individual probability of existence of the entity based on each feature associated with the entity;
   combining the individual probabilities of existence of the entity based on the associated features by using the classifier to determine the fusion score; and
   using the aggregation calibration function to calibrate the fusion score to the probability of existence of the entity.

8. The method of claim 1, wherein the classifier and the aggregation calibration function are determined by a machine learning model, further comprising selecting training data comprising a set of video items, each video item having at least a feature of the set of features, and providing the training data to the machine learning model.

9. The method of claim 1, further comprising determining a probability of existence for each entity of the plurality of entities based on the associated features for the video frame.

10. The method of claim 9, further comprising determining the probability of existence for each entity of the plurality of entities based on the associated set of features for each video frame of the video item.

11. The method of claim 1, further comprising:
   receiving a search query from a user; and
   providing the video item including the video frame to the user in response to determining the search query matches the entity.

12. A system comprising:
   a processor for executing computer program instructions; and
   a non-transitory computer-readable storage medium comprising computer program instructions executable by the processor, the computer program instructions comprising:
      instructions for identifying an entity from a plurality of entities identifying characteristics of video items;
      instructions for, from a plurality of features characterizing the video items, selecting a set of features correlated with the entity based on a value of each feature;
      instructions for determining a classifier for the entity using the set of features, the classifier being a linear fusion model for the entity based on the set of features and determining the classifier comprising determining a weight vector for each feature of the set of features;
      instructions for determining an aggregation calibration function for the entity based on the set of features, the aggregation calibration function calibrating a fusion score to a probability of the entity being central to an individual video frame;
      instructions for selecting a video frame from a video item, the video frame having associated features; and
      instructions for determining a probability of existence of the entity based on the associated features using the classifier and the aggregation calibration function.

13. The system of claim 12, wherein the computer program instructions further comprises instructions for labeling the video frame with the entity and the probability of existence of the entity.

14. The system of claim 12, wherein the computer program instructions for selecting a set of features correlated with the entity comprises instructions for determining a calibration function that calibrates a value of a feature of the plurality of features to an individual probability of existence of the entity.

15. The system of claim 14, wherein the computer instructions for selecting a set of features correlated with the entity comprises determining the individual probability of existence of the entity based on the value of each feature of the plurality of features, and the individual probabilities of existence of the entity for the plurality of features are normalized.

16. The system of claim 12, wherein the computer program instructions further comprises instructions for determining a probability of existence for each entity of the plurality of entities based on the associated features for the video frame.

17. The system of claim 12, wherein the computer program instructions further comprises:
   instructions for receiving a search query from a user; and
   instructions for providing the video item including the video frame to the user in response to determining the search query matches the entity.

18. A non-transitory computer-readable storage medium comprising computer program instructions executable by a processor, the computer program instructions comprising:
   instructions for identifying an entity from a plurality of entities identifying characteristics of video items;
   instructions for, from a plurality of features characterizing the video items, selecting a set of features correlated with the entity based on a value of each feature;
   instructions for determining a classifier for the entity using the set of features, the classifier being a linear fusion model for the entity based on the set of features and determining the classifier comprising determining a weight vector for each feature of the set of features;
   instructions for determining an aggregation calibration function for the entity based on the set of features, the aggregation calibration function calibrating a fusion score to a probability of the entity being central to an individual video frame;
   instructions for selecting a video frame from a video item, the video frame having associated features; and
   instructions for determining a probability of existence of the entity based on the associated features using the classifier and the aggregation calibration function.

19. The system of claim 12, wherein the classifier and the aggregation calibration function are determined by a machine learning model, further comprising selecting training data comprising a set of video items, each video item having at least a feature of the set of features, and providing the training data to the machine learning model.

20. The system of claim 12, wherein the instructions for determining a classifier for the entity comprises instructions for maximizing a precision for the linear fusion model and maintaining a recall to be at least a given threshold value.

* * * * *